United States Patent Office 3,567,591
Patented Mar. 2, 1971

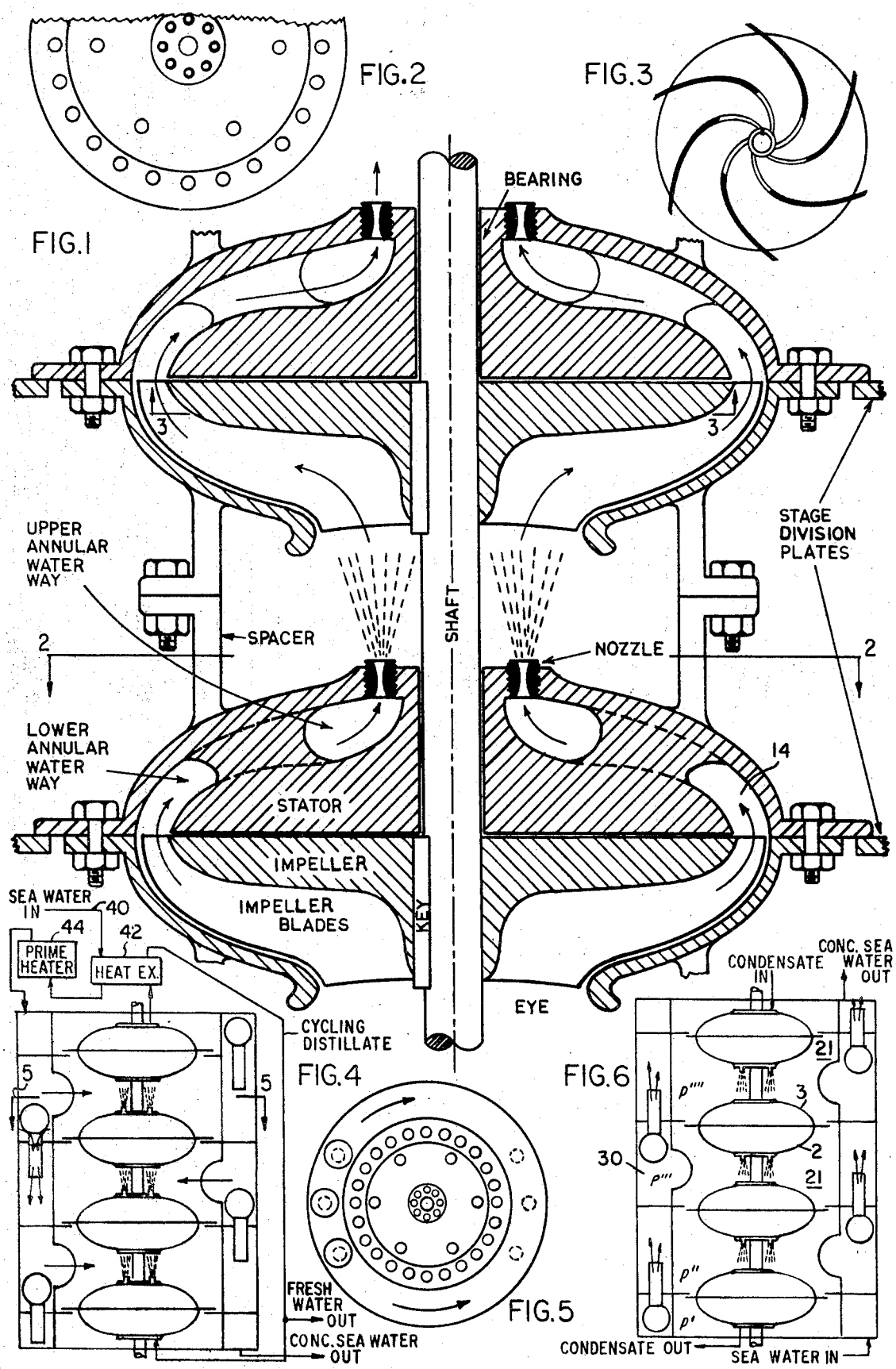

---

3,567,591
METHOD FOR OPEN MULTICONDENSATION OF VAPORS FROM MULTIFLASH EVAPORATIONS
Donald F. Othmer, 333 Jay St.,
Brooklyn, N.Y. 11201
Continuation of application Ser. No. 652,368, June 12, 1968, which is a continuation-in-part of application Ser. No. 252,473, Jan. 18, 1963. This application Mar. 3, 1969, Ser. No. 809,457
Int. Cl. B01d 3/06; C02b 1/06
U.S. Cl. 203—26                                18 Claims

ABSTRACT OF THE DISCLOSURE

Multiflash evaporation for concentrating solutions, and producing fresh water wherein vapors from a flash evaporator at a lower pressure is condensed and entrained in a colder stream of liquid sprayed through the open vapor space between two centrifugal pumps, the spray of condensing liquid and entrained vapors being directed into the suction eye of a first centrifugal pump thereby compressing the entrained vapors. The resultant condensing liquid and compressed vapors are then discharged as a second spray into the suction eye of a second co-acting centrifugal pump, the second spray passing through the open vapor space of the next higher pressure flash evaporation stage.

---

This is a continuation of my application Ser. No. 652,368 filed June 12, 1967 and titled Method for Open Multicondensation of Vapors From Multiflash Evaporations and now abandoned; which in turn is a continuation-in-part of my application Ser. No. 252,473, filed Jan. 18, 1963, now U.S. Pat. No. 3,329,583, and titled Method for Producing Pure Water From Sea Water and Other Solutions by Flash Vaporization and Condensation.

This invention relates to a method of condensing a series of vapor streams from multiflash evaporations of successively lower pressures by means of a series of sprays discharged by pumps to give a direct heat transfer surface of large surface area and very great heat transfer rates between vapor and liquid. Each pump is designed to lift the cooling or condensing liquid, together with the condensate formed, through the range of pressure of one of the several stages. The discharge of a lower pressure pump sprays into the suction opening or "eye" of the next higher pressure pump, where it is drawn into the pump and passed, together with entrained vapors and non-condensible gases, to the next higher stage. Entrained vapors are non-condensible gases, to the next higher stage. Entrained vapors are condensed by the pressure within the pump. The process is repeated for each stage.

This system of condensation and its passage of condensing liquid and of condensate together to successively higher stages, may be used in conjunction with the vapor reheat system of multiflash evaporation, which is described more fully in the parent application Ser. No. 252,473 of Jan. 18, 1963, now U.S. Pat. No. 3,329,583 of July 4, 1967. Furthermore, it also may be used with the method for cooling of volatile liquids which is described in U.S. Pat. No. 3,306,346 of Feb. 28, 1967. Also, it may be used in various operations wherein a chemical reaction or other processing step is to be accomplished at an elevated temperature; herein a heat interchanging of one liquid by substantially the same liquid is necessary when it is desired to recover the heat which is lost otherwise in the heating of the liquid to the elevated temperature. Two typical and well known examples are: (a) the heating of hard water to remove the scale-forming salts therein, as described more fully in co-pending application Ser. No. 639,989 of May 22, 1967, now U.S. Pat. No. 3,446,712; and (b) the heating of water with combustible organic material to a sufficiently high temperature to inaugurate a wet combustion at about 350° F., as described more fully in co-pending application Ser. No. 639,989 of May 22, 1967. In both cases, the heated water may be cooled by a vapor reheat flash evaporation, to give multiple streams of vapors which are used to preheat countercurrently additional feed in open condensation stages.

Water is the usual solvent to be handled in these and many other heat-interchanging operations. The multiflash evaporator has been applied usually to sea water and other saline solutions in order to produce substantially pure water while discharging a brine from two to five times as concentrated. However, dilute solutions of other liquids than water also may be considered and handled by this process; and other aqueous solutions than sea or other saline waters also may be utilized in this process, including many where the prime object is to concentrate; others where the prime object may be to conduct a chemical reaction or other processing of liquid at an elevated temperature while recovering the large amount of heat required to heat the solution up to the required high temperature.

The present method combines the several operations taking place in a series of condensing zones or stages connected with corresponding multiflash evaporator zones or stages. One operation is the transfer of the cooling liquid—often the cold feed into the process—from a lower pressure of one stage of condensation to the higher pressure of the next stage of condensation. A second is the dispersion of the cooling liquid accomplishing the condensation into a large number of droplets in a spray in open flow or free flight through the vapor space or condensation zone immediately connected to the flash vaporization, whereby a considerable amount of liquid surface is provided in open contact with the vapors to allow their condensation. A third is the entrainment of some vapors, along with any non-condensible gas which may be mixed therewith, into the suction of the pump on the next higher stage. A fourth is the condensing of the entrained vapors by means of their compression during the passage of the condensing liquid through this next pump, while heating the liquid. A fifth is the passing of non-condensible gases to the next higher stage and successively to an ultimate exhaust from the highest pressure stage.

These functions are provided in the series of vapor zones by a system of pumps which may often be driven by a common shaft—usually vertical. Each pump impeller may be driven separately, or several of a series of stages may be combined on a common shaft. Depending on the size and weight, part or all may be on a single shaft when this proves most economical, since it is the most desirable in many cases.

These several operations in the condensing zones are used either for concentration of a dilute solution with concomitant production of fresh water condensate, when evaporation is the main object, or as a heat interchanger of substantially the same liquid in both the condensation and the evaporation sides of the system. In the case of heat interchanging, there may be substantially no change in the concentration of the product from that of the feed and no net production of fresh water condensate by the process. Here the vapors, condensing directly in the cold liquid feed used as condensing liquid, dilute it slightly in the direct contact heating and condensing.

With steam having about 1000 B.t.u.'s per pound, and since 1 B.t.u. raises about one pound of dilute solution 1° F., if the temperature is raised about 1° F. there is a dilution of 0.1%; or for 100° F. temperature increment, there is about 10% dilution. Thus, the somewhat more diluted feed, having been heated by the heat interchanging, has the operation or process conducted on it after or while being heated still further; and it is then flash evaporated to be cooled, possibly in many stages—but the same number as the open condensations. Except for heat losses, the evaporation—and thus concentration—of the hot liquid ultimately going off as cold product, is equal to the condensation—and dilution—of the feed liquid coming into the system. Thus, there is no important net change in concentration; and if the dilution was 10% in condensing 0.1 pound of steam in heating 100° F., there would be about the same amount of vapors given off to cool the hot solution down to the discharge temperature while concentrating it to about the original concentration.

In the figures:

FIG. 1 is a diagrammatic cross-sectional view of a flow sheet of one embodiment of the process, showing parts of three stages, and of two complete pumps on a common shaft.

FIG. 2 is a partial top view, taken along line 2—2 of FIG. 1, of the casing of one of the pumps of the process of FIG. 1.

FIG. 3 is a bottom view, taken along line 3—3—looking upward—of the impeller of one of the pumps utilized in the process of FIG. 1.

FIG. 4 is a vertical cross-section of a multi-stage unit showing a diagrammatic flow sheet of one method of operating the process of multiple handling of the combined stream of condensing liquid and condensate as part of a multistage evaporation-condensation system used.

FIG. 5 is a horizontal cross-section, taken along line 5—5 of FIG. 4 of the system of FIG. 4, with the central part being the condensing zone of each stage, and the annular space around it being the flash-evaporation zone.

FIG. 6 is a view similar to FIG. 4 but showing the multistage unit in inverted condition.

DESCRIPTION OF THE FIGURES

FIG. 1 diagrams a cross-section of three chambers or condensing zones, each directly connected with the corresponding one of the multi-flash evaporation zones of the several stages of decreasing pressure. The upper one has a pressure of P', the middle one of P'', the third one of P'''.

The stage bottoms are indicated as 1', 1'', 1''', etc., as the bottom of the stage where the pressure in is P', the bottom 1'' wherein there is the pressure P'', and so on. A common shaft extends through the several condensing zones, and this shaft has, as its bearings, the stator or upper machined castings of each of several special centrifugal pumps of similar design. Connected to the shaft by key 9 is the impeller 7, which rotates with the shaft in each case. Impellers 7 have blades 8 which are shown only in their outline of revolution in the cross-section of FIG. 1, as a blank space. The eye 10 of the lower casing 3 receives a spray of droplets of liquid from the next lower pressure pump, which are coalesced to a body of liquid, along with more or less vapors and non-condensible gases. These gases and liquid are caught by the centrifugal force imparted by the blades 8, as is standard in a conventional centrifugal pump, forced between the solid part of the impeller and the lower casing 3, to pass into the upper casing 2 just at the outer part of the lower annular waterway 11. The condensible vapors by now are condensed under the maximum pressure on the pump at this point. Any non-condensible gases continue as droplets in the body of liquid; and the mixture is passed through the cored passageways 14, which are openings left in the casting, to the upper liquid waterway 12, a wholly open circular passageway which acts as a plenum for discharge of the liquid and any non-condensible gases through the nozzles 13, and thence into the vapor space of the next higher pressure condensing zone. The discharge of the nozzle is by a spray, or a series of sprays, the angle of discharge and direction of which are such as to have the spray collected entirely within the eye of the next higher pump. A series of nozzles on a circle are fitted into the upper casing 2, above the plenum 12, and all of the nozzles discharge through the vapor space as droplets in free flight and into the eye of the next higher pump.

The upper casing assembly is bolted to the lower casing by bolts 16; and the flange of the upper casing 4 overhangs the opening provided in the plates 1', 1'', 1''', etc. A gasketed, bolted connection (or other suitable tight connection) may be used, but is not detailed in this flow sheet. The several impellers are connected in exact alignment and relation to each other by spacers 17, with bolts 18.

FIG. 2 shows a top view of somewhat over half of the casing, to show the inter-relation of the several parts already described. The relationship of the nozzles 13 to the central shaft, is indicated, also that of the spacers 17 and the bolts 16 on their respective bolt circle.

Thus, both suction and discharge of the pump are parallel to the shaft. Because of the relatively low pressure difference from stage to stage, it is not necessary to provide stuffing boxes, glands, and packings to prevent the very small leakage which may occur. However, any leakage of vapors from an upper stage to a lower stage along the shaft and in the plane between the impeller and the stator would only give contact of vapors with the liquid which will immediately condense them anyway. More probably, leakage would be in the other direction, with a small amount of liquid coming up around the shaft to the vapor space which it would otherwise contact immediately anyway as a spray.

FIG. 3 is a bottom view of the impeller removed from its housing 3; and thus it is plain that the FIG. 1 has the cross-section taken along a cycloidal path so as to show only the blank space 8 for the impeller blades.

FIG. 4 shows a combination of several stages of pressures P', P'', P''', etc. These several stages are shown in a system of the type shown and described in U.S. Pat. No. 3,329,583 mentioned above. In this system, sea water enters in via an inlet conduit 40 to a heat exchanger 42. Upon emerging from the heat exchanger 42, the sea water passes through a prime heater 44 and enters into an upper annular space 30 forming a part of a first flash vaporization stage. At the lower end of the system, there is provided an outlet conduit 46 exiting from the lowermost annular space 30 for emitting concentrated sea water. Condensate delivered from the uppermost of the multi-impeller pumps 2 enters into the heat exchanger 42; and upon emerging from this heat exchanger, it is returned as cycling distillate back around to the inlet of the lowermost of the multi-impeller pumps 2. There is additionally provided a fresh water outlet conduit 48 through which fresh water is extracted from the cycling distillate. All of the multi-impeller pumps 2 are here on a common shaft, with the sprays of liquid 19 going from the nozzle 13 to the respective eye of the next higher pump. In this case, the flash vaporization part of the stage is indicated as an outer annular space 30, with vapors passing inwardly through the division walls 22 between the evaporating zone and the condensing zone 21, through the opening 23, to the condensing zone 21 which is the central chamber. Direction of vapors is indicated by the horizontal arrows. The means here shown—one of many—of accomplishing the flash evaporation in the annular flashing zone, is for the hot liquid in an upper stage to fill the annular space 30 until it floats the hollow balls 20 seated on the top of the down-comer tubes 25. As the balls start to float due to liquid rising around them, they begin to discharge liquid between the seat of the ball 20 and the down-comer 25. Because of the lower pressure in the next lower stage, the liquid immediately tends to cool by flash evaporation, and a mixture of liquid and vapor is discharged through the bottom of the down-comers 25. A mixture of liquid and vapor is discharged directly downwardly; and both liquid and vapor then must pass in a half circle around the annular space wherein they are completely separated, with the liquid floating the ball or balls 20 on this stage, to allow it to pass then through the down-comer 25 to the next lower stage, and the process is repeated. The vapors separated from the liquid pass through the opening 23 in the wall 22, thence to the inner condensing zone 21 to be condensed by the sprays 19, with the condensate carried along with the cooling liquid of the spray into the next higher one of the multi-impeller pumps.

FIG. 5 indicates the cross-sectional view of the entire assembly of FIG. 4, showing three balls-floats 20 in the evaporating zone 30 on each plate seated on down-comers 25, with the liquids and vapors passing around the wall 22 between the evaporating zone to discharge: the liquids under balls 20 and down-comer 25, to the next lower section, and the vapors through openings 23 into the condensing zone 21 of the stage.

In the drawing, the dotted circles on the right indicate the down-comers 25 from the plate above, with the liquid by dashed arrow showing its direction from the right to the left, and the vapor travelling in the same direction, as shown by the longer arrow. The vapors pass through the opening (not shown) in the wall 22 separating the vaporization zone 30 and the condensation zone 21, and are condensed by the sprays coming upwardly from the nozzles 13.

PROCESS USING JET CONDENSERS AND MULTI-IMPELLER PUMP

The figures indicate one device which may be used for this method of flowing fresh water distillate upwardly from stage to stage in a vapor reheat evaporation of sea water or of other process liquid being heated in successive condensing zones against: (a) the hydrostatic head, (b) the difference in vapor pressure, (c) the pipe friction and (d) the resistance of the water stream to being broken up into droplets having a large total surface. At the same time, vapors from the flash evaporation in the evaporation compartment on the same stage are being condensed due to the intimate contact secured with the fresh water.

The stages may be divided out of a vertical cylinder by horizontal plates, in much the same way as the standard bubble cap plates divide the usual distilling column into sections. This is indicated in FIG. 4, a vertical cross-section, and in FIG. 5, a horizontal cross-section. Each stage plate has attached thereto a stator and upper shell assembly of a special centrifugal pump having, overall, an axial flow. The top view of one such upper shell is shown in FIG. 2. These pumps are arranged perpendicularly on a common shaft to which is keyed the impeller for each stage. A bottom or suction "eye" view of an impeller is shown in FIG. 3. Spacer legs are bolted together to give a rigid and aligned connection between the stator or upper casting of one stage and the impeller housing of the next higher stage.

The impeller housing has a wide "eye" for inlet of fluids, with channels machined to minimize hydraulic losses. The impeller suction through the "eye" takes streams of drops from spray jets with entrained vapor. The jets are exactly aimed from the next lower unit to be included in this suction eye. Most condensation takes place in the vapor space on the water drops of the jets, and the rate of condensation, and the total area of the droplets are both many times the area and rate of condensation of any surface heat exchanger which would be used. Wide passageways between the impeller blades and the impeller housing allow minimum suction resistance. This distance between stator and housing—the blade height—lessens as the distance from center increases to give sufficient compression of the vapor-liquid mixture to allow simultaneous condensation of the vapor.

The discharge of the original cooling liquid and the condensate added thereto is into the lower annular waterway of the stator. Vanes between the stator and its integral casing direct the flow of the cooling water and condensate stream through the passageways shown by the dotted lines of the lower unit of FIG. 1 and the open spaces of the upper unit, to the upper annular waterway. This is a plenum which supplies flow to separately machined and inserted orifices in the top of the casing which direct a series of flooding jets into the suction eye of the next higher impeller. Alternately, a circular, annular orifice may discharge vertically, a cylindrical sheet of water; but this is not indicated in the diagram.

The hydraulic design of the impeller and of the stator is such as to combine the functions of: (a) receiving the combination of vapor and liquid from the entraining action of the jets, (b) further contacting and compressing the mixture and hence condensing the entrained vapors, (c) directing the flow from an axial direction, to an outward-radial direction, then again to an axial direction, to an inward-radial direction, and again to an axial direction, (d) discharging through a series of jets on a circle (or a circular, annular orifice) in such a stream of droplets as to contact and entrain a maximum of vapor passing through some inches of free space into the suction of the next higher impeller. It is seen that the function of the pump partakes of the function both of a centrifugal pump and of a centrifugal gas compressor, and the design is modified to accommodate these functions.

Thus, the impeller has a more open design than that of the usual centrifugal pump for handling a liquid without vapor, since much vapor is entering entrained in the liquid spray as compared to the usual centrifugal pump. An unusually large eye (both as to diameter and depth of the impeller blade) is provided for ready entrainment of the large volume of vapors which is drawn into the pump by the fresh water jets or sprays from the nozzles of the next lower stage. The space for fluid travel between the blades narrows nearer the periphery of the impeller; because, by the time the fresh water reaches the periphery, all vapors are condensed due to the combination of cooling and compressive action. However, the operation is so controlled by the amount of fresh water recycled or feed liquid supplied, as the case may be, that it is not heated by the condensation of vapors above the temperature desired for its entrance into the next stage. The net result of the impeller therefore is to carry new condensate along with the stream of liquid entering the stage-up to the next stage and not to form additional condensate by the compression of vapors above the vapor pressure of the stage from which they leave. Non-condensable gases which are present may be compressed and passed from stage to next higher pressure stage to discharge them from all stages at a higher pressure.

Each impeller runs inside a close-fitting housing, the design of which is such as to provide a large free passageway between the vanes with a modest development of liquid head or pressure adequate to force the liquid to the higher pressure to the next higher stage. This pressure is adequate to condense immediately all of the vapor which was not condensed by the water jets prior to entering the eye of the pump. The vapor entrained by the jets and condensed on the water therein and in the impeller is that entering the condensing side of the stage under the conditions of flash evaporation, vapor pressure, etc. which pertain.

The highest pressure generated is, as usual, at the blade tips and discharge of the impeller, which in the design shown discharges vertically into the water passageways of the stator. Many satisfactory designs are possible; but, as diagrammed in FIG. 1, the stator has two annular water passageways, the lower annular waterway forming a receiver at the discharge of the impeller; and the upper annular waterway forming a chamber of plenum for supplying the nozzles. These waterway openings are provided by suitable cores in the casting which forms the upper half or stator of the pump assembly.

In between the two annular passages of this stator are a multiplicity of connecting ports or water passages through the solid section also formed by suitable cores, or by subsequent machining of the casting, as shown by the dotted lines in the lower assembly. The cross-section view of the upper of the two units shown in FIG. 1 is cut through these connecting passageways between the outer and inner liquid passages, and thus shows open passages for water flow. Several holes are drilled vertically, near the axis, to the water passageways at the top of the stator. These are tapped and fitted with individually threaded nozzles of a design to give the desired spray action discharging immediately into the eye of the next impeller directly above.

As diagrammed in FIG. 1, the stator casting is bolted to the bottom or impeller housing to make an assembly for each stage, and a bearing for the shaft. An axial hole is drilled and reamed in the stator as a bearing for the shaft. A sleeve bearing or one of other suitable design may be fitted therein, if desired.

Depending on the size of the pump unit, six or more spacer legs are fastened or cast integrally to both the upper and lower halves of the pumps, as shown in the detail of FIG. 1, but not in the vertical cross-section of FIG. 4. These spacers for adjacent assembles are bolted together to make a rigid, central unit of the desired number of pumps, one for each stage. This axial unit can be handled and assembled as a separate entity with an exactly aligned shaft. Steps are also included as an enlargement of the top flange connection to allow each pump to set on the division plate of the respective stage.

In the vertical section of several stages of a unit, as shown in FIG. 4, and the horizontal section of FIG. 5, the impellers are 22 inch in diameter—carried on a 2 inch shaft, and the 8 fixed orifices discharge jets through the vapors for a vertical distance of about 4 inches. Ten stages are included in one shell; and the 10 impellers are driven by a direct-connected motor supported on the domed cover, not shown. The pump stator of the top stage has the upper annular waterway connected to a pipe for discharge outside the unit; and the inlet of fresh water for recycle, or feed liquid—as the case may be, at the bottom stage, is through jets fixed in an appropriate ring in the bottom plate.

An annular space with an external diameter of 48 inches and an internal diameter of 32 inches, is the vaporizing zone for the sea water or other heated liquid flash evaporating and cooling. In this case, the flow from plate to next lower plate is controlled by simple, hollow metal ball floats 6 inches in diameter, discharging through downcomers, set as are those in a distilling tower. Three such ball floats are on one side of a plate; by their floating action, they each lift off of the top rim of the down-comer pipe to open a circular orifice, or weir, or valve seat, and discharge to maintain a constant vaporizing level of approximately 1 inch of sea water on the floor of the annular space. The vaporizing liquid travels around the annular space. Entrainment is thus minimized, as most of the vaporization is accomplished just below the ball seat, and the travel of the liquid and the vapor halfway around the annular space allows most of any mist or droplets which might be entrained to settle out of the vapors. The vapors which are formed in the flash evaporation, after passing in both directions around the annular space, find at the extremity of a diameter an opening in the inner shell which is adjacent to the liquid discharge to the next lower plate. The vapors enter the central, condensing area, pass thence to the jets from the stage beneath; and the suction of the impeller which forces condensate to the next stage above.

This arrangement, diagrammed in FIG. 1, with the spacers of adjacent assemblies bolted together, allows for ready removal of the entire condensing and pumping assembly for inspection and adjustment. Many aspects of the design of the multi-impeller pump and condenser assembly may be varied; and this invention is not concerned with the exact details of such designs, but rather with the method and use of such a multi-impeller unit in this process of handling a mixture of condensate and of the cooling liquid in the condensing zones.

There is very little hold-up or residence time for condensing liquid in each stage; and the condensing liquid only contacts and entrains the vapor of each stage in passing through the vapor space of the condensing zone of the stage.

While the volume of condensing liquid to be handled by the pumps does not vary greatly from stage to stage, it does increase slightly, usually not more than 10 to 20% from the lowest pressure stage, inlet, to the highest pressure stage, outlet. This is because of the accumulation of condensate added in the stages. However, the volume of the vapors may vary considerably because of the considerable variation in specific volume from low to high pressure. (The amount of heat transferred is usually about the same from stage to stage, and hence the weight of the vapors.) To accommodate the effect of the larger vapor volume—lower density—in the lower pressure stages, there may be: (a) an increase in the distance between stages, to allow a greater travel of sprays of condensing liquid, hence more contact time, (b) a greater depth of impeller blades at the center and slightly bigger eye to allow easier suction of vapors.

In a Vapor Reheat system of large capacity, more than one assembly of the multi-impeller pump and jet condenser on a shaft may be used in series, since the number of stages of 30 to 50 used commercially may be too large for the installation of so many units on a single shaft.

Also, for larger capacities, larger pumps than those of FIG. 1 may be used, also several or more such assemblies may be installed parallel to the axis of a single large shell, a circular cylinder or other suitable shape. Thus, while the unit diagrammed is of relatively small capacity, many of the multi-impeller condensing pumps may be installed in parallel, vertically, all through the same stage division plates, as are many bubble caps installed in a distilling column to multiply their unitary capacity. While individual bubble caps in a distilling column may or may not be vertically disposed, in relation to those of plates above and below, this is of no importance; in this case, however, the units must be vertically aligned on a shaft. As with bubble caps, a large number of units may be used on the several plates; but for a practical design, the number of multi-impeller pumps is limited. Thus, if the number of such pumps per stage exceeds one half the number of stages, as it will in large installations with millions of gallons per day of evaporation, the design most economic in construction may use a single pump for the distillate per stage, with spray nozzles or other separate water-dispersing arrangements in the stage. This will also be more easily controlled and maintained in practice.

In those operations at pressures above atmospheric, the vapor-reheat ladder may be conveniently inverted, as shown in FIG. 6, with the evaporating brine *climbing* the evaporator-cooling side, rather than going downwardly, as indicated in FIGS. 1 and 4. This is possible because of the substantial difference in vapor pressure from stage to stage. The distillate then may be passed from the condensing zones stage to stage by the multi-impeller pump and jet condenser assembly by inverting the unit from that shown in the diagram of FIGS. 1 and 4. The design of ports, brine handling, etc. will be modified accordingly; but the effect of pumping liquid to a stage of higher pressure is the same, with the advantage that any sprayed liquid (distillate) which goes outside the suction eye of the pump may build up in a volume of liquid outside of the unit—and then overflow into the suction eye along with the descending spray from the stage of lower pressure above. Thus, the multi-impeller pump and jet condenser assembly may be used under these conditions in a vertical ladder with the high pressure stage at the bottom and the low pressure stage at the top.

In such an inverted unit, the fresh water discharges through jets *downwardly* in each stage, through the vapor space of the condensing zone, and into the upward-looking eye of the impeller of the next lower stage, which now has a *higher* vapor pressure. This arrangement may be used only with units where the lowest drop in vapor pressure from stage to stage is sufficient to lift the sea water or other liquid being heated through the difference in elevation between stages, as well as to accommodate hydraulic friction. In such a system, "upside down" as compared to FIGS. 1 and 4, there may be large number of stages. However, the lowest temperature and pressure (now at the top) will not be less than those at about the normal boiling point of water, if there is to be sufficient pressure difference in each stage to allow the sea water in the flash evaporation zones of the stages to work upwardly under the action only of the difference of vapor pressure stage to stage. This is progressively less at lower temperatures for the same temperature difference because of the shape of the vapor pressure curve of water. Below the normal boiling point of water, the change of vapor pressure per stage decreases so little per degree of temperature difference that the vapor pressure alone may not be sufficient to force the sea water or other liquid being cooled by flash evaporation upwardly from stage to stage—unless, indeed, there are only a few stages and the temperature and hence pressure difference per stage is thus large. This however, depends also on the height for each stage; and hydraulic considerations for flow of the liquid being evaporated from each stage to the next must be considered in such design. It will be possible to aid the flow and accomplish the flash evaporation stage by stage by another system of multi-impeller pumps on the flash evaporation side, exactly like that on the condensation side. This is not usually necessary.

Any system involving heat transfer from vapors including normal ordinary evaporation, usual multiflash evaporation, and vapor reheat, requires deaeration to maximize the rate of condensation of steam, particularly if condensation occurs at pressures below the ambient and there is the opportunity for slight leaks of air into the system. Vapor reheat processes usually may be suplied, as are other, with more or less standard systems for such deaerating purposes. However, the present multi-impeller pump may, by the hydraulic compression in the pump as indicated above, either augment or replace other methods of removal of non-condensible gases from the stages of lower pressures to the top stage, from which they may be discharged by conventionl means—or by suction into and discharge from a centrifugal pump as described; but with a single pipe for outlet, instead of the nozzles shown. The heated liquid and the gases discharge together and are separated before or during the next step of the processing, if desired.

In the use of the vapor reheat multi-flash for desalinating sea water, the fresh water recycled as condensing liquid in the method of condensation of vapors by the jet condensers and pumps of this invention, passes from the condensing zone of highest pressure and temperature and then through a heat exchanger, to preheat the sea water feed. The preheated feed is then further heated in a prime heater by some source of heat and at its highest temperature passes to the high temperature one of the series of flash evaporations.

While discussed above primarily in regard to evaporation in general, and desalination in particular, this process is equally useful in the simple heat exchanger arrangement whereby a feed liquid is being heated in the multiple-condensing zones prior to a chemical or physical reaction at an elevated temperature, usually with an additional supply of outside or prime heat; and then the resulting liquid is multiflashed to cool it—while heat interchanging by the method of this invention to preheat the next incoming feed.

I claim:

1. In the process of condensing at least two streams of vapors from a multistage flash evaporation of a liquid conducted at several successively lower pressures, the steps comprising:
    (a) the condensation of one of said streams of vapors from the flash evaporation at a lower pressure by the spraying of a stream of colder, condensing liquid through an open vapor space between two centrifugal pumps and connected to the zone of said flash evaporation, thereby condensing a part of said vapors and entraining another part of said vapors, while heating said condensing liquid;
    (b) the directing of the path of such spray of condensing liquid, together with entrained vapors, directly into the suction eye of a first centrifugal pump;
    (c) the increase of pressure of the condensing liquid, together with entrained vapors, directed within the eye of the impeller of the first centrifugal pump, thereby compressing such entrained vapor to cause condensation thereof within the pump, while further heating said condensing liquid;
    (d) the discharge of the condensing liquid, now somewhat warmer, due to the compression plus the condensate formed by the first centrifugal pump through at least one nozzle as a second spray into and through the open vapors of the stage of next higher pressure, to condense and to entrain vapors of the stream of vapors formed in the flash evaporation accomplished in the stage of next higher pressure;
    (e) the directing of the said second spray, together with some entrained vapors formed in the flash evaporation of the next higher pressure into the suction eye of a second centrifugal pump which condenses the entrained vapors while heating still further the condensing liquid; and
    (f) the increase of pressure, the condensing of vapors, and the discharge of the condensing liquid and the condensate added therto by the second centrifugal pump to a still higher pressure than that of the condensing zone of said next higher pressure.

2. In the process of claim 1, wherein the discharge of each spray into the eye of the respective pump is vertically upwardly; and the pumps are vertically disposed successively above each other in a series of increasing pressures, with each impeller fastened to and turned by a common central shaft.

3. In the process of claim 1, wherein the discharge of each spray into the eye of the respective pump is vertically downwardly; and the pumps are vertically disposed successively below each other in a series of increasing pressures, with each impeller fastened to and turned by a comon central shaft.

4. The process of claim 1, wherein the liquid being flash evaporated in a series of stages to supply streams of vapors for the condensation is substantially the same liquid which is being heated by the several condensations after undergoing a chemical or physical change after passing the top stage of the condensing zones and before being passed to the high pressure stage of the evaporating zones of the multiflash evaporation.

5. In the process of claim 1, wherein the condensing liquid being circulated by the pumps of the multicondensation operation is substantially pure water formed by condensation of vapors upon a stream of substantially pure water, which is cooled after the top stage of the condensing zones in a heat interchanger to preheat the dilute liquid feed which is passed to the prime heater of the system, and thence to the multistage flash evaporations.

6. In the process of claim 1, wherein the said streams of vapors to be condensed have small amounts of noncondensible gases present wherein the non-condensible gases are entrained within the sprays of cooling liquid along with the vapors and are compressed within each respective pump to the pressure of the next higher pressure condensing zone, finally being discharged from the zone of highest pressure.

7. A method of condensing vapors present in a multistage evaporation system comprising a plurality of chambers at different pressures, said method comprising the steps of projecting through a lower pressure chamber from a location at one side thereof an open flow of condensing liquid at a temperature below that of the vapors in said lower pressure chamber in such a manner that said vapors become in part condensed by, and in further part entrained by, direct contact with the flow of condensing liquid, said open flow of condensing liquid being of sufficient velocity and direction to project, along with the entrained vapors, directly into the suction eye of a first pump positioned across from said one side, pressurizing said liquid and vapors in said first pump to a pressure higher than that within said lower pressure chamber, thereby condensing said entrained vapors, projecting the resultant pressurized output of said first pump from a location at one side thereof through a second, higher pressure, chamber as an open flow of condensing liquid at a temperature below that of the vapors therein, thereby to effect condensation and entrainment of the vapors in said higher pressure chamber, said last mentioned open flow of condensing liquid being of sufficient velocity and direction to spray along with the entrained vapors in said second higher pressure chamber and is caused to enter directly into the suction eye of a second pump positioned across from said last mentioned one side, pressurizing said liquid and vapors in said second pump sufficiently to effect condensation of the vapors from said higher pressure chamber, and recovering the output of said second pump.

8. A method according to claim 7 wherein said chambers are arranged one above the other in order of pressure with said pumps positioned intermediate and interconnecting adjacent chambers.

9. A method according to claim 7 wherein the pressurizing in said pumps is achieved centrifugally.

10. A method according to claim 7 wherein said pumps are driven simultaneously from a common shaft.

11. A method according to claim 7 wherein said vapors are of the same substance as said condensing liquid.

12. A method according to claim 8 wherein the output of each pump is discharged vertically upward, into the next adjacent chamber as a liquid spray.

13. A method according to claim 7 wherein said condensing is carried out simultaneously with the flash evaporation of liquid in each of said chambers in a multistage flash evaporation operation.

14. A method according to claim 7 wherein the vapors present in said chambers are obtained from successive associated stages of a multistage flash evaporator.

15. A multistage evaporation system for the recovery of a volatile liquid solvent from a solution comprising a plurality of pressure isolated chambers arranged one above the other, a plurality of fluid impeller pumps positioned one between each pair of said chambers, said pumps each being constructed to aspirate from the chamber immediately therebelow a mixture of said liquid solvent and vaporized solvent into the inlet eye of the impeller pump immediately thereabove and to pressurize said mixture to substantially complete liquid form and to discharge the so pressurized mixture as an open flow spray into and through the pump chamber immediately thereabove.

16. A multistage evaporation system according to claim 15 wherein each of said pumps is driven from a common shaft.

17. A multistage evaporation system according to claim 15 wherein said pumps are of the centrifugal type.

18. A multistage evaporation system according to claim 15 wherein said pumps each have an enlarged inlet opening to the chamber immediately therebelow and a spray nozzle outlet opening to the chamber immediately thereabove.

References Cited

UNITED STATES PATENTS

| | | | |
|---|---|---|---|
| 1,782,959 | 11/1930 | Elliott | 159—2 |
| 1,799,478 | 4/1931 | Peebles | 159—2U |
| 2,894,879 | 7/1959 | Hickman | 202—236X |
| 2,999,796 | 9/1961 | Bromley | 202—236X |
| 3,200,050 | 8/1965 | Hogan et al. | 202—236 |
| 3,233,879 | 2/1966 | Mitchell | 202—236X |
| 2,018,049 | 10/1935 | Allen | 202—236 |
| 3,219,554 | 11/1965 | Woodward | 202—173 |

FOREIGN PATENTS

| | | | |
|---|---|---|---|
| 124,261 | 3/1910 | Great Britain | 202—236 |
| 967,675 | 8/1964 | Great Britain | 159—2ms |

WILBUR L. BASCOMB, JR., Primary Examiner

F. E. DRUMMOND, Assistant Examiner

U.S. Cl. X.R.

202—173, 185, 202; 203—11, 80, 88